United States Patent
Lee

(10) Patent No.: US 7,098,725 B2
(45) Date of Patent: Aug. 29, 2006

(54) MULTI STAGE VOLTAGE PUMP CIRCUIT

(75) Inventor: Dong-Uk Lee, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 76 days.

(21) Appl. No.: 10/874,240

(22) Filed: Jun. 24, 2004

(65) Prior Publication Data

US 2005/0093614 A1  May 5, 2005

(30) Foreign Application Priority Data

Oct. 30, 2003  (KR) .................. 10-2003-0076257

(51) Int. Cl.
*G05F 1/10* (2006.01)
(52) U.S. Cl. .................................. 327/536
(58) Field of Classification Search ............... 327/530, 327/534, 535, 536, 537
See application file for complete search history.

(56) References Cited

U.S. PATENT DOCUMENTS 6,107,864 A * 8/2000 Fukushima et al. ......... 327/536
6,501,325 B1 * 12/2002 Meng ......................... 327/536
6,734,717 B1 * 5/2004 Min ........................... 327/536
6,819,162 B1 * 11/2004 Pelliconi .................... 327/536

FOREIGN PATENT DOCUMENTS

| KR | 1020010027124 | 4/2001 |
| KR | 1020030057872 | 7/2003 |

* cited by examiner

*Primary Examiner*—Jeffrey Zweizig
(74) *Attorney, Agent, or Firm*—Mayer, Brown, Rowe and Maw LLP

(57) ABSTRACT

A multi stage voltage pumping circuit includes a plurality of voltage pumping stages each operated by a first clock signal and a second clock signal for raising a voltage level of an inputted voltage; and a plurality of charge storing means each connected to outputs of the plurality of voltage pumping stages respectively except for a last voltage pumping stage in order to store charge, wherein each of the plurality of voltage pumping stages is a cross coupled voltage doubler and an output of a previous voltage pumping stage is connected to an input of a next voltage pumping stage.

8 Claims, 6 Drawing Sheets

US 7,098,725 B2

MULTI STAGE VOLTAGE PUMP CIRCUIT

FIELD OF INVENTION

The present invention relates to a semiconductor device; and, more particularly, to a multi stage voltage pumping circuit capable of raising a voltage level of a power supply voltage for obtaining a high voltage.

DESCRIPTION OF PRIOR ART

Generally, an integrated semiconductor circuit includes a voltage pumping circuit for raising a voltage level of a power supply voltage supplied from an external circuit of the integrated semiconductor circuit, and, thus to obtain a required high voltage. For instance, the voltage pumping circuit is applied for generating a voltage required to operate a word line included in a dynamic random access memory (DRAM) or for generating a high voltage power supply in a flash memory.

FIG. 1 is a schematic circuit diagram showing a conventional multi stage voltage pumping circuit.

As shown, the conventional multi stage voltage pumping circuit includes a plurality of N-channel metal oxide semiconductor (NMOS) transistors $M_1$ to $M_N$ connected in series, and each of the plurality of NMOS transistors $M_1$ to $M_N$ is diode-connected by shorting a gate and a drain in order to control current flow from a power supply voltage VDD to an output voltage VOUT.

There are a plurality of connection nodes $V_1$ between the NMOS transistor $M_1$ and the NMOS transistor $M_2$, $V_2$ between the NMOS transistor $M_2$ and the NMOS transistor $M_3$, . . . and $V_{N-1}$ between the NMOS transistor $M_{N-1}$, and the NMOS transistor $M_N$. A plurality of pumping capacitors $C_1$ to $C_{N-1}$ are connected to the plurality of connection nodes $V_1$ to $V_{N-1}$ respectively. A clock signal clk is inputted to the capacitor $C_1$, the capacitor $C_3$, . . . and the capacitor $C_{N-1}$. An inverted signal of the clock signal clk, i.e., a clock bar signal clkb is inputted to the capacitor $C_2$, the capacitor $C_4$, . . . and the capacitor $C_{N-2}$.

Each charge stored in the plurality of pumping capacitors $C_1$ to $C_{N-1}$ is pumped to the plurality of connection nodes $V_1$ to $V_{N-1}$ respectively by the clock signal clk and the clock bar signal clkb, in order to raise voltage levels of the plurality of connection nodes $V_1$ to $V_{N-1}$.

A load capacitor $C_L$ is connected to the output voltage VOUT so that the output voltage VOUT can be loaded on the load capacitor $C_L$.

If the clock signal clk is in a logic LOW level and the clock bar signal clkb is in a logic HIGH level, a voltage of VDD–Vth is loaded on the node V1, and a charge Q1 having amount of $C_1 \times (VDD-Vth)$ is stored in the capacitor $C_1$, wherein the Vth is a threshold voltage.

Thereafter, if the clock signal clk is changed into a logic HIGH level and the clock bar signal clkb is changed into a logic LOW level, the node $V_1$ keeps the charge Q1 and has a voltage of VDD+(VDD–Vth) according to the electric charge conservation law. Since the NMOS transistor $M_1$ is diode-connected, it is turned off while $V_N$ is greater than $V_{N-1}$. As a result, a voltage of the node $V_1$, i.e., VDD+(VDD–Vth) is transferred to the node $V_2$ so that the node $V_2$ has a voltage of 2VDD–2Vth.

Likewise, as the clock signal clk and the clock bar signal clkb keep toggling, the output voltage VOUT becomes a required high voltage.

However, at each of the plurality of the NMOS transistors $M_1$ to $M_N$, there occurs a voltage loss due to the threshold voltage Vth, and each of the plurality of the NMOS transistors $M_1$ to $M_N$ consumes a power of $I_{load} \times Vth \times N$. Therefore, the conventional multi stage voltage pumping circuit has low efficiency of transferring current.

SUMMARY OF INVENTION

It is, therefore, an object of the present invention to provide a multi stage pumping circuit for generating a required high voltage having ability of preventing unnecessary power consumption of each stage of the multi stage pumping circuit, and, thus to prevent low efficiency of transferring current.

In accordance with an aspect of the present invention, there is provided a multi stage voltage pumping circuit including a plurality of voltage pumping stages each operated by a first clock signal and a second clock signal for raising a voltage level of an inputted voltage; and a plurality of charge storing means each connected to outputs of the plurality of voltage pumping stages respectively except for a last voltage pumping stage in order to store charge, wherein each of the plurality of voltage pumping stages is a cross coupled voltage doubler and an output of a previous voltage pumping stage is connected to an input of a next voltage pumping stage.

In accordance with an another aspect of the present invention, there is provided a multi stage voltage pumping circuit including a clock signal generating means for generating a first clock signal and a second clock signal; a plurality of voltage pumping stages each operated by the first clock signal and the second clock signal for raising a voltage level of an inputted voltage; and a plurality of charge storing means each connected to outputs of the plurality of voltage pumping stages respectively except for a last voltage pumping stage in order to store charge, wherein the first clock signal is an inverted signal of the second clock signal and is not overlapped with the second clock signal, and each of the plurality of voltage pumping stages is a cross coupled voltage doubler operated by the first clock signal and the second clock signal.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a multi stage voltage pumping circuit in accordance with the present invention will be described in detail referring to the accompanying drawings.

Figure 1:
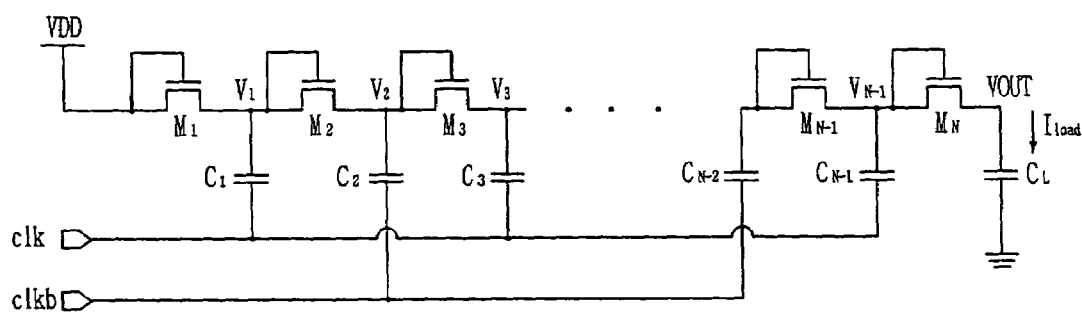
FIG. 1 is a schematic circuit diagram showing a conventional multi stage voltage pumping circuit.
Figure 2:
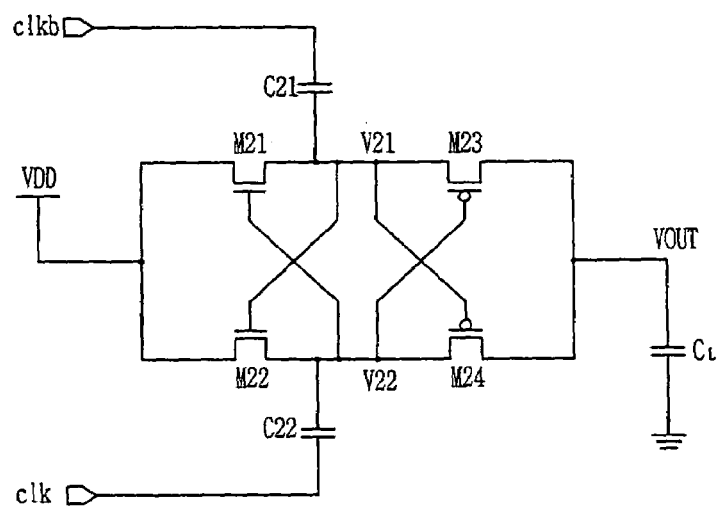
FIG. 2 is a schematic circuit diagram showing a conventional cross coupled voltage doubler.

FIG. 2 is a schematic circuit diagram showing a cross coupled voltage doubler generally used for a high voltage oscillator.

An operation of the cross coupled voltage doubler is described below for explaining the principle of the present invention.

As shown, the cross coupled voltage doubler includes a first pumping capacitor C21, a second pumping capacitor C22, a first N-channel metal oxide semiconductor (NMOS) transistor pair M21 and M22 and a first P-channel metal oxide semiconductor (PMOS) transistor pair M23 and M24.

One side of the first pumping capacitor C21 receives a clock bar signal clkb and the other side is connected to a first node V21. Likewise, one side of the second pumping capacitor C22 receives a clock signal clk and the other side is connected to a second node V22.

A gate of the NMOS transistor M21, a drain of the NMOS transistor M22, a gate of the NMOS transistor M23 and a source of the NMOS transistor M24 are connected to the second node V22. Likewise, a gate of the NMOS transistor M24, a source of the NMOS transistor M23, a drain of the NMOS transistor M21 and a gate of the NMOS transistor M22 are connected to the first node V21. The first NMOS transistor pair M21 and M22 transfers a power supply voltage VDD to the first node V21 and the second node V22. The first PMOS transistor pair M23 and M24 transfers voltage loaded on the first node V21 and the second node V22 to an output voltage VOUT.

As shown above, since PMOS transistors and NMOS transistors included in the cross coupled voltage doubler are cross-connected, switch gates, i.e., gates of the first NMOS transistor pair M21 and M22 are controlled by higher voltage level than that of VDD+Vth, i.e., voltage levels of the first and the second nodes V21 and V22 are 2VDD. Herein, the Vth is a threshold voltage. Therefore, it occurs no voltage loss due to a threshold voltage. Therefore, the cross coupled voltage doubler can generate the output voltage VOUT having voltage level of 2VDD from the power supply voltage VDD.

The multi stage voltage pumping circuit in accordance with the present invention applies the cross coupled voltage doubler for generating a required high voltage stably having high efficiency of transferring current.

Figure 3:
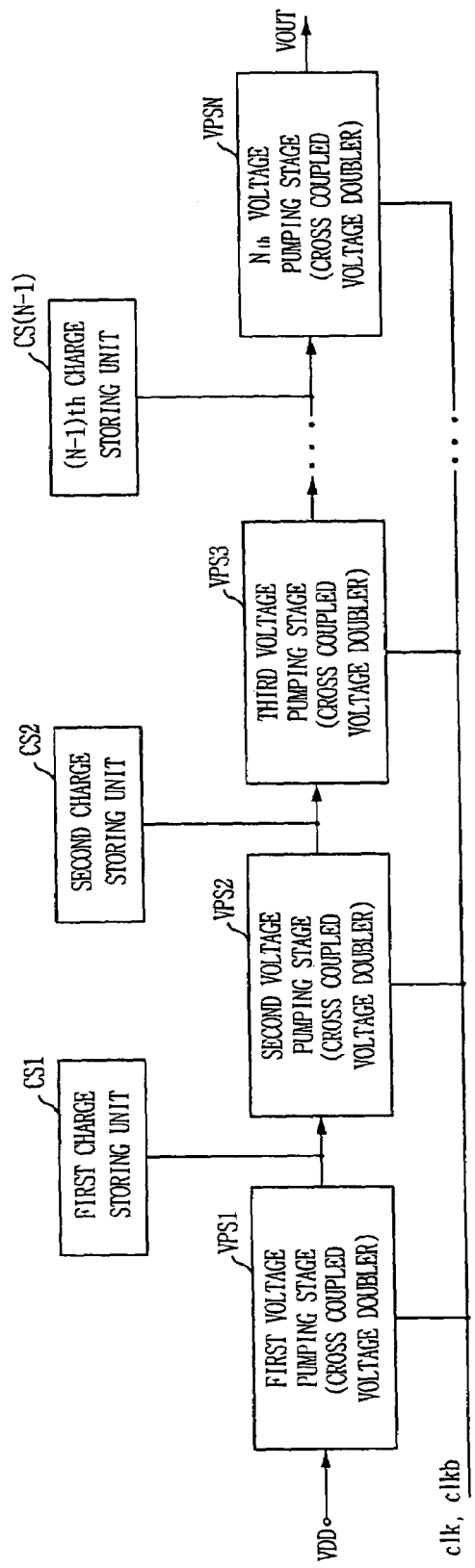
FIG. 3 is a block diagram showing a multi stage voltage pumping circuit in accordance with the present invention.

FIG. 3 is a block diagram showing the multi stage voltage pumping circuit in accordance with the present invention.

As shown, the multi stage voltage pumping circuit includes N numbers of voltage pumping stages VPS1 to VPSN connected in series between a power supply voltage VDD and an output voltage VOUT. Each of the voltage pumping stages VPS1 to VPSN is a cross-coupled voltage doubler described in FIG. 2 operating in response to a clock signal clk and a clock bar signal clkb.

There are a first charge storing unit CS1 connected between the first voltage pumping stage VPS1 and the second voltage pumping stage VPS2, a second charge storing unit CS2 connected between the second voltage pumping stage VPS2 and the third voltage pumping stage VPS3, . . . and a (N–1)th charge storing unit CS(N–1) connected between the (N–1)th voltage pumping stage VPS(N–1) and the Nth voltage pumping stage VPSN.

The clock bar signal clkb is an inverted signal of the clock signal clk and is not overlapped with the clock signal clk.

Figure 4:
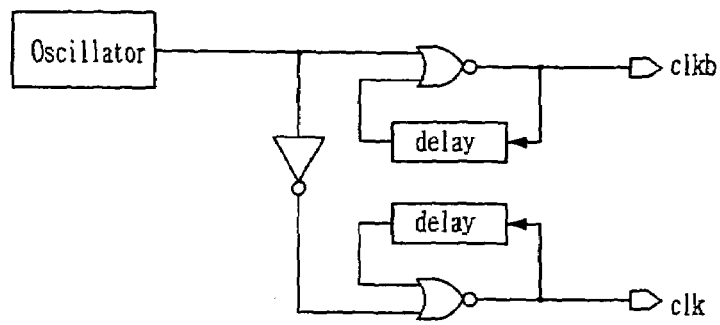
FIG. 4 is a circuit diagram showing a non overlapping clock generator.

FIG. 4 is a circuit diagram showing a non-overlapping clock generator for generating the clock signal clk and the clock bar signal clkb.

As described above, since the multi stage voltage pumping circuit adopts N numbers of cross coupled voltage doublers as voltage pumping stages, there occurs no power loss due to a threshold voltage of a MOS transistor, and, thus, unnecessary power consumption and low efficiency of power transfer can be prevented. In addition, since the multi stage voltage pumping circuit stably generates a required high voltage from low voltage, the multi stage voltage pumping circuit is useful for a semiconductor memory device which consumes low voltage to be operated.

Figure 5:
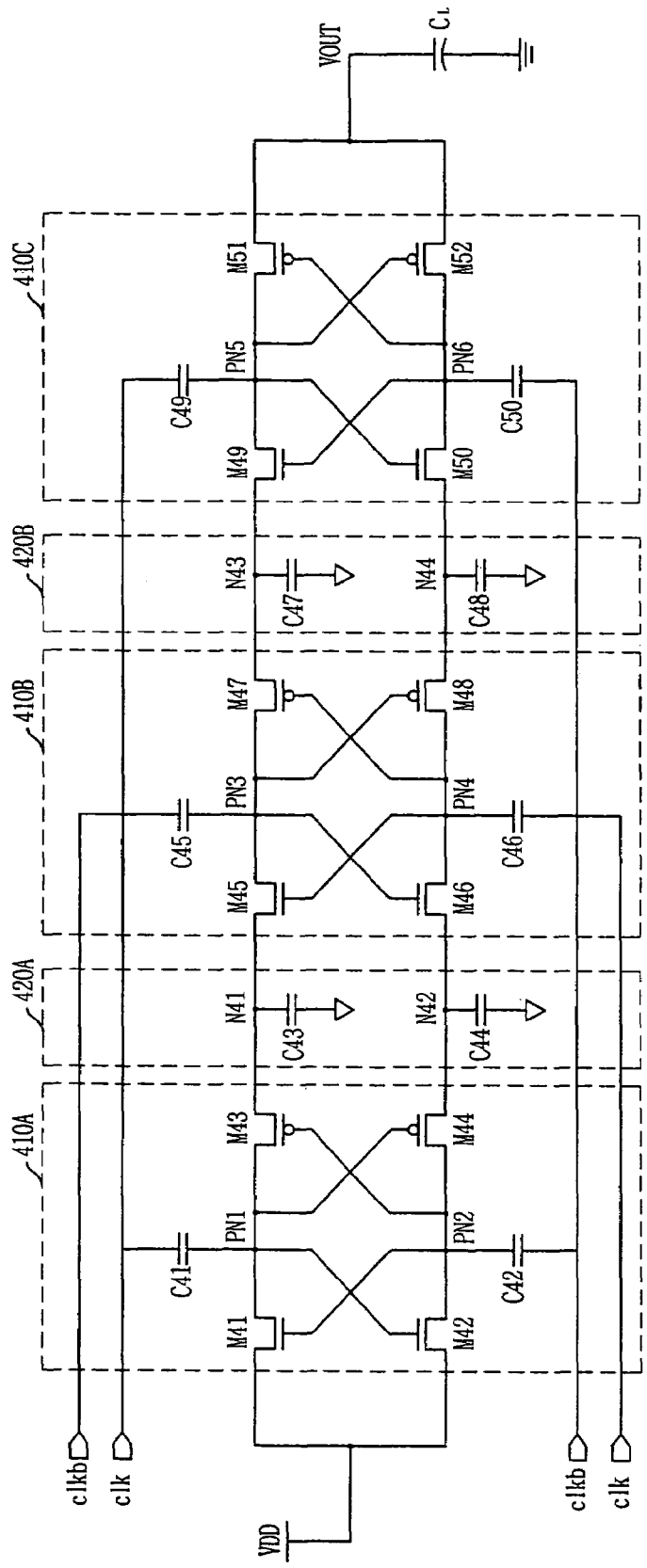
FIG. 5 is a schematic circuit diagram showing a multi stage voltage pumping circuit in accordance with a first preferred embodiment of the present invention.

FIG. 5 is a schematic circuit diagram showing a multi stage voltage pumping circuit in accordance with a preferred embodiment of the present invention.

As shown, the multi stage voltage pumping circuit includes a first voltage pumping stage 410A, a second voltage pumping stage 410B, a third voltage pumping stage 410C, a first charge storing unit 420A and a second charge storing unit 420B.

The first voltage pumping stage 410A doubles a power supply voltage VDD and transfers the doubled power supply voltage VDD to the first charge storing unit 420A. The second voltage pumping stage 410B doubles voltage loaded in the first charge storing unit 420A and transfers the doubled voltage to the second charge storing unit 420B. Likewise, the third voltage pumping stage 410C doubles voltage loaded in the second charge storing unit 420B and outputs the doubled voltage as an output voltage VOUT. As a result, a voltage level of the output voltage VOUT is four times higher than that of the power supply voltage VDD.

The first charge storing unit 420A includes two capacitors C43 and C44 connected to a first node N41 and a second node N42 respectively for storing voltage transferred from the first voltage pumping stage 410A. Likewise, the second charge storing unit 420B includes two capacitors C47 and C48 connected to a third node N43 and a fourth node N44 respectively for storing voltage transferred from the second voltage pumping stage 410B.

The first voltage pumping stage 410A includes a first NMOS transistor M41, a second NMOS transistor M42, a first PMOS transistor M43, a second PMOS transistor M44, a first pumping capacitor C41 and a second pumping capacitor C42.

The first NMOS transistor M41 whose gate is connected to a second pumping node PN2 is connected between the power supply voltage VDD and a first pumping node PN1. The second NMOS transistor M42 whose gate is connected to the first pumping node PN1 is connected between the power supply voltage VDD and the second pumping node PN2.

The first PMOS transistor M43 whose gate is connected to the second pumping node PN2 is connected between the first pumping node PN1 and the first node N41. The second PMOS transistor M44 whose gate is connected to the first pumping node PN1 is connected between the second pumping node PN2 and the second node N42.

One side of the first pumping capacitor C41 receives a clock signal clk and the other side is connected to the first pumping node PN1. Likewise, one side of the second pumping capacitor C42 receives a clock bar signal clkb and the other side is connected to the second pumping node PN2.

When the first voltage pumping stage 410 is operated normally after it is initialized, an operation of the first voltage pumping stage 410A is described below.

If the clock signal clk becomes in a logic HIGH level and the clock bar signal clkb becomes in a logic LOW level, the second NMOS transistor M42 and the first PMOS transistor M43 are turned on, and the first NMOS transistor M41 and the second PMOS transistor M44 are turned off.

At this time, the power supply voltage VDD is loaded on the second pumping node PN2 and voltage of 2VDD is loaded on the first pumping node PN1. Herein, it is assumed that a parasitic capacitance for each of the first and the second NMOS transistors M41 and M42 and the first and the second PMOS transistors M43 and M44 is ignored. As a result, the voltage of 2VDD is loaded on the first node N41 due to the first PMOS transistor M43.

Likewise, if the clock signal clk becomes in a logic LOW level and the clock bar signal clkb becomes in a logic LOW level, the second NMOS transistor M42 and the first PMOS transistor M43 are turned off, and the first NMOS transistor M41 and the second PMOS transistor M44 are turned on.

Therefore, the power supply voltage VDD is loaded on the first pumping node PN1 and voltage of 2VDD is loaded on the second pumping node PN2. As a result, the voltage of 2VDD is loaded on the second node N42 due to the second PMOS transistor M44.

The structure of the second voltage pumping stage 410B and the third voltage pumping stage 410C is the same as that of the first voltage pumping stage 410A except that a third pumping capacitor C45 and a fourth pumping capacitor C46 included in the second voltage pumping stage 410B are operated by the clock bar signal clkb and the clock signal clk respectively.

That is, each pumping capacitor is operated by the clock bar signal clkb or the clock signal clk having a different level from that of the pumping capacitor included in the neighboring voltage pumping stage.

For instance, the third pumping capacitor C45 is operated by the clock bar signal clkb, but the first pumping capacitor C41 and a fifth pumping capacitor C49 are operated by the clock signal clk.

An operation of the second voltage pumping stage 410B is the same as that of the first voltage pumping stage 410A except that the second voltage pumping stage 410B receives the voltage of 2VDD from the first charge storing unit 420A when the first and second nodes N41 and N42 are in a steady state.

Therefore, the second voltage pumping stage 410B generates voltage whose level is three times higher than that of the power supply voltage VDD, i.e., 3VDD. Likewise, the third voltage pumping stage 410C generates voltage whose level is four times higher than that of the power supply voltage VDD, i.e., 4VDD.

Figure 6:
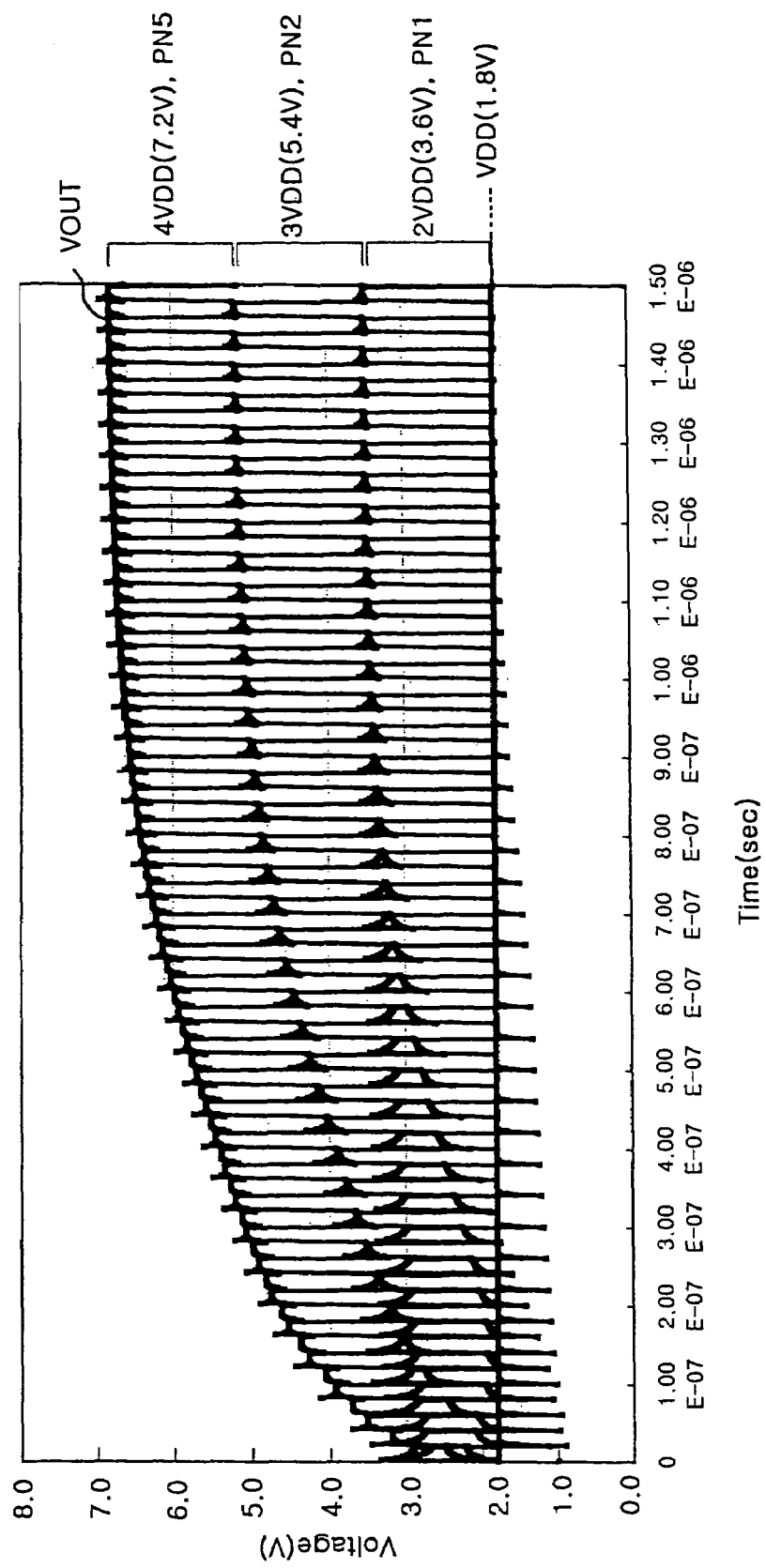
FIG. 6 is a simulated timing diagram showing an operation of the multi stage voltage pumping circuit in accordance with the first preferred embodiment of the present invention.

FIG. 6 is a timing diagram showing a simulated result of an operation of the multi stage voltage pumping circuit.

As shown, a voltage level of the first pumping node PN1 becomes two times higher than that of the power supply voltage VDD after a predetermined time, and, finally, the output voltage VOUT is generated having voltage of 4VDD. Herein, the power supply voltage VDD is set to be 1.8V and the predetermined time is about 1.50E–06 sec.

The output voltage VOUT should have voltage of 4VDD, i.e., 7.2V, ideally. However, the output voltage VOUT can not reach an ideal voltage of 4VDD because each MOS transistor included in the multi stage voltage pumping circuit has a parasitic capacitance and there exists a coupling between charge transferring capacitance.

Figure 7:
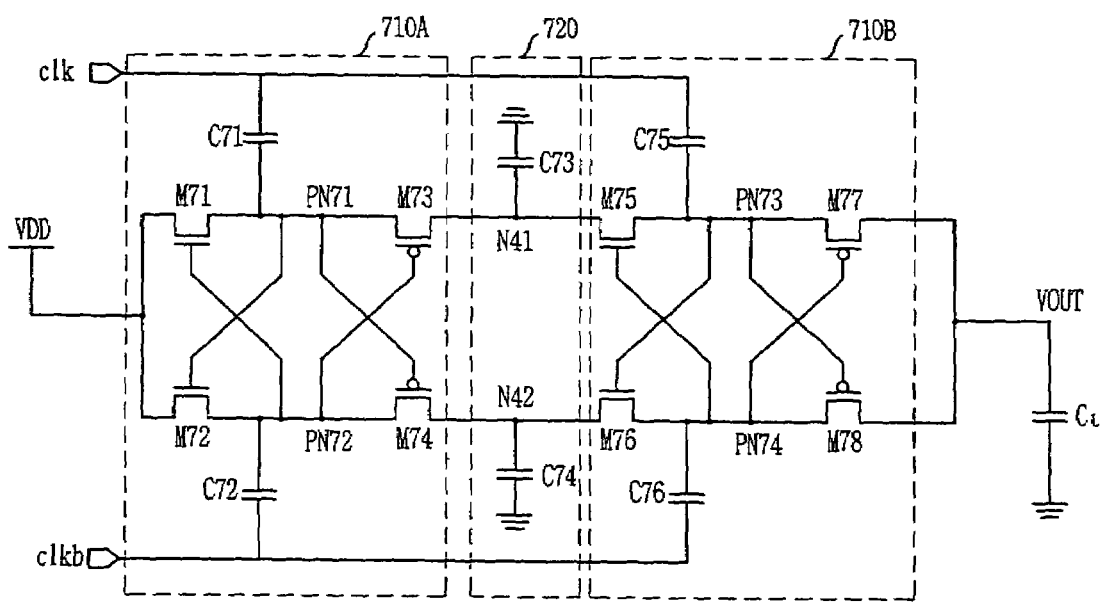
FIG. 7 is a schematic circuit diagram showing a multi stage voltage pumping circuit in accordance with a second preferred embodiment of the present invention.

FIG. 7 is a schematic circuit diagram showing a multi stage voltage pumping circuit in accordance with a second preferred embodiment of the present invention.

As shown, the multi stage voltage pumping circuit includes a first voltage pumping stage 710A, a second voltage pumping stage 710B and a charge storing unit 720. Each of the first voltage pumping stage 710A and the second voltage pumping stage 710B is a cross coupled voltage doubler which serves to double its input voltage.

The first voltage pumping stage 710A receives a power supply voltage VDD and doubles a voltage level of the power supply voltage VDD for transferring the doubled power supply voltage VDD to the charge storing unit 720.

Likewise, the second voltage pumping stage 710B doubles a voltage level of the doubled power supply voltage VDD stored in the charge storing unit 720, and, thus to output an output voltage VOUT whose voltage level is three times higher than that of the power supply voltage VDD.

The charge storing unit 720 includes a first capacitor C73 and a second capacitor C74. One side of the first capacitor C73 is connected to the first node N41 and the other side is grounded. Likewise, one side of the second capacitor C74 is connected to the second node N42 and the other side is grounded.

The first voltage pumping stage includes a first NMOS transistor M71, a second NMOS transistor M72, a first PMOS transistor M73, a second PMOS transistor M74, a first pumping capacitor C71 and a second pumping capacitor C72.

The first NMOS transistor M71 is connected between the power supply voltage VDD and a first pumping node PN71, and a gate of the first NMOS transistor M71 is connected to a second pumping node PN72. The second NMOS transistor M72 is connected between the power supply voltage VDD and the second node PN72, and a gate of the second NMOS transistor M72 is connected to the first pumping node PN71.

The first PMOS transistor M73 is connected between the first pumping node PN71 and the first node N41, and a gate of the first PMOS transistor M73 is connected to the second pumping node PN72. The second PMOS transistor M74 is connected between the second pumping node PN72 and the second node N42, and a gate of the second PMOS transistor M74 is connected to the first pumping node PN71.

One side of the first pumping capacitor C71 is connected to the first pumping node PN71 and the other side receives a clock signal clk. Likewise, one side of the second pumping capacitor C72 is connected to the second pumping node PN72 and the other side receives a clock bar signal clkb.

As shown in FIG. 7, the structure of the second voltage pumping stage 710B is the same as that of the first voltage pumping stage 710A.

Figure 8:
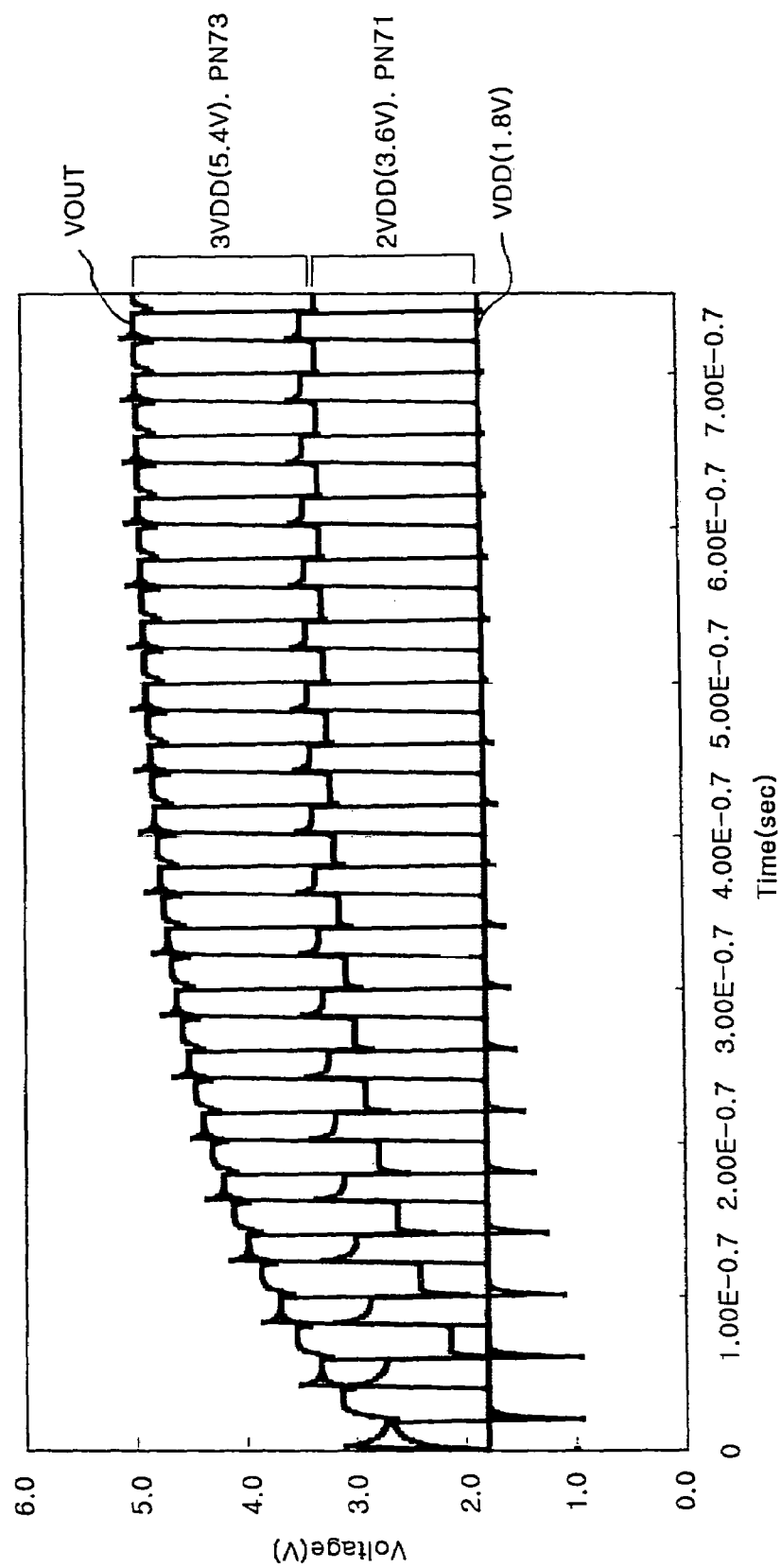
FIG. 8 is a simulated timing diagram showing an operation of the multi stage voltage pumping circuit in accordance with the second preferred embodiment of the present invention.

FIG. 8 is a timing diagram showing a simulated result of an operation of the multi stage voltage pumping circuit.

As shown, a voltage level of the first pumping node PN1 becomes two times higher than that of the power supply voltage VDD after a predetermined time, and, finally, the output voltage VOUT is generated having voltage of 3VDD. Herein, the power supply voltage VDD is set to be 1.8V and the predetermined time is about 7.00E–07 sec.

The output voltage VOUT should have voltage of 3VDD, i.e., 5.4V, ideally. However, as shown in FIG. 8, the output voltage VOUT does not reach an ideal voltage of 3VDD because each MOS transistor included in the multi stage voltage pumping circuit has a parasitic capacitance and there exists a coupling between charge transferring capacitance.

As described above, the multi stage voltage pumping circuit in accordance with the present invention adopts N numbers of cross coupled voltage doublers as voltage pumping stages for obtaining a required high voltage whose voltage level is N times higher than that of an inputted power supply voltage.

Since a cross coupled voltage doubler is adopted as a voltage pumping stage, there occurs no power loss due to a threshold voltage of a MOS transistor included in a voltage pumping stage, and, thus, high efficiency of power transfer can be obtained.

In addition, since the multi stage voltage pumping circuit stably generates a required high voltage from a low voltage, the multi stage voltage pumping circuit can be nicely applied to a semiconductor memory device which uses a low power supply voltage.

The present application contains subject matter related to Korean patent application No. 2003-76257, filed in the Korean Patent Office on Oct. 30, 2003, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A multi stage voltage pumping circuit comprising:
a plurality of voltage pumping stages each operated by a first clock signal and a second clock signal for raising a voltage level of an inputted voltage; and
a plurality of charge storing means, each corresponding to each of the plurality of voltage pumping stages except for a last voltage pumping stage in order to store charge, wherein each of the plurality of voltage pumping stages is a cross coupled voltage doubler and an output of a previous voltage pumping stage is connected to an input of a next voltage pumping stage, wherein each of the plurality of charge storing means includes a capacitor whose one side is connected to an output of the voltage pumping stage and the other side is grounded.

2. The multi stage voltage pumping circuit as recited in claim 1, wherein the cross coupled voltage doubler includes:
a first pumping capacitor one side of which receives the first clock signal and the other side is connected to a first node;
a second pumping capacitor one side of which receives the second clock signal and the other side is connected to a second node;
a first NMOS transistor pair whose gates and drains are cross coupled to the first node and the second node for transferring the inputted voltage to the first node and the second node; and
a first PMOS transistor pair whose gates and sources are cross coupled to the first node and the second node for outputting voltage of the first node and the second node.

3. The multi stage voltage pumping circuit as recited in claim 2, wherein each of the plurality of charge storing means includes a capacitor whose one side is connected to an output of the voltage pumping stage and the other side is grounded.

4. A multi stage voltage pumping circuit comprising:
a clock signal generating means for generating a first clock signal and a second clock signal;
a plurality of voltage pumping stages each operated by the first clock signal and the second clock signal for raising a voltage level of an inputted voltage; and
a plurality of charge storing means each corresponding to each of the plurality of voltage pumping stages respectively except for a last voltage pumping stage in order to store charge, wherein the first clock signal is an inverted signal of the second clock signal and is not overlapped with the second clock signal, and each of the plurality of voltage pumping stages is a cross coupled voltage doubler operated by the first clock signal and the second clock signal, wherein each of the plurality of charge storing means includes a capacitor whose one side is connected to an output of the voltage pumping stage and the other side is grounded.

5. The multi stage voltage pumping circuit as recited in claim 4, wherein the cross coupled voltage doubler includes:
a first and a second input terminals;
a first and a second nodes;
a first and a second output terminals;
a first transistor which is connected between the first input terminal and the first node, and whose gate is connected to the second node;
a second transistor which is connected between the second input terminal and the second node, and whose gate is connected to the first node;
a third transistor which is connected between the first node and the first output terminal, and whose gate is connected to the second output terminal;
a fourth transistor which is connected between the second node and the second terminal, and whose gate is connected to the first output terminal;
a first pumping capacitor whose one side is connected to the first node and the other side receives the first clock signal; and
a second pumping capacitor whose one side is connected to the second node and the other side receives the second clock signal.

6. The multi stage voltage pumping circuit as recited in claim 5, wherein a first voltage pumping stage among the plurality of voltage pumping stages receives a power supply voltage through the first and the second input terminals of the first voltage pumping stage, and the first and the second input terminals of the first voltage pumping stage are connected each other.

7. The multi stage voltage pumping circuit as recited in claim 5, wherein the first and the second output terminals of a last voltage pumping stage among the plurality of voltage pumping stages are connected each other.

8. The multi stage voltage pumping circuit as recited in claim 5, wherein each of the plurality of charge storing means includes:
a first capacitor whose one side is connected to the first output terminal and the other side is grounded;
a second capacitor whose one side is connected to the second output terminal and the other side is grounded.

* * * * *